Figure 1:
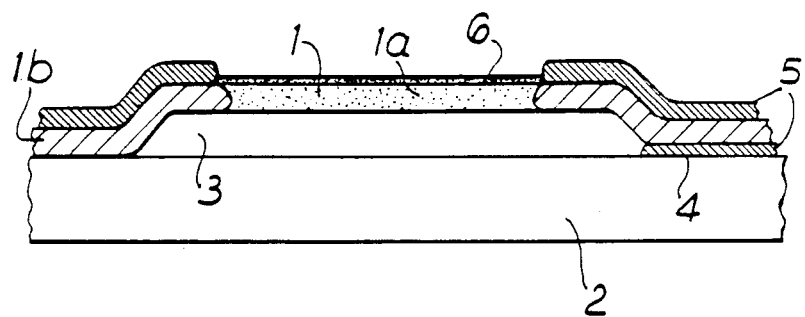

United States Patent [19]

Evans et al.

[11] Patent Number: 4,849,050
[45] Date of Patent: * Jul. 18, 1989

[54] METHOD OF PRODUCING A DIAPHRAGM ON A SUBSTRATE

[75] Inventors: Alan G. R. Evans, Eastleigh; Mohammed M. Farooqui, Southampton. both of England

[73] Assignee: Spectrol Reliance Limited, Swindon, England

[*] Notice: The portion of the term of this patent subsequent to Jul. 18, 2006 has been disclaimed.

[21] Appl. No.: 131,057

[22] Filed: Dec. 9, 1987

[30] Foreign Application Priority Data

Dec. 13, 1986 [GB] United Kingdom ............... 8629818

[51] Int. Cl.⁴ .......................................... H01L 29/84
[52] U.S. Cl. .................................. 156/657; 156/644; 156/662; 437/228; 437/233; 437/927; 437/968; 357/26; 29/621.1

[58] Field of Search ............... 156/630, 643, 644, 646, 156/655, 657, 659.1, 662; 148/DIG. 159; 437/927, 968, 921, 901, 228, 233; 73/715, 720, 721, 724, 726, 727, DIG. 4; 357/26; 29/610 SG; 338/4; 92/103 SD

[56] References Cited

U.S. PATENT DOCUMENTS 4,592,238 6/1986 Busta ........................... 73/727

FOREIGN PATENT DOCUMENTS 58-78471 5/1983 Japan .......................... 357/26

Primary Examiner—David L. Lacey
Assistant Examiner—Andrew J. Anderson

[57] ABSTRACT

The invention provides a method of producing on a substrate a diaphragm which is electrically isolated from the substrate. The method comprises obtaining a substrate (2) having a diaphragm(1) thereon which comprises a flexible central portion (1a) and a shouldered peripheral portion which supports the central portion (1a) above the substrate (2), applying a mask (6) over at least a part of the central portion (1a) and converting the unmasked portion (1b) of the diaphragm to a dielectric so as to electrically isolate the masked central portion (1a) of the diaphragm from the substrate (2).

20 Claims, 1 Drawing Sheet

METHOD OF PRODUCING A DIAPHRAGM ON A SUBSTRATE

CROSS REFERENCE TO RELATED APPLICATIONS

This application is related to U.S. Ser. No. 131,058, filed Dec. 9, 1987 corresponding to British application No. 8629819, and to U.S. Ser. No. 131,059, filed Dec. 9, 1987 British application No. 8629817.

This invention relates to a method of producing a diaphragm on a substrate and more particularly to producing on a substrate a diaphragm which is electrically isolated from the substrate.

In devices such as capacitance transducers it is frequently necessary that the thin diaphragm is electrically isolated from the substrate on which the diaphragm is supported. In such cases it is important not only to have low loss dielectric isolation of the diaphragm from the substrate but also to maintain suitable elastic properties in the isolating dielectric.

It is known to produce a polysilicon diaphragm on a silicon substrate by depositing on the silicon substrate a sacrificial layer of silicon dioxide and etching or otherwise patterning the deposited sacrificial layer to the required diaphragm size. The sacrificial layer is provided with arms of reduced thickness which extend outwardly therefrom and serve to define etch channels. A polysilicon diaphragm layer is then provided, e.g., deposited, over the sacrificial layer so that the diaphragm layer overlaps the sacrificial layer except in the region of said outwardly extending arms. The sacrificial layer is then removed as by etching in hydrogen fluoride or other suitable etchant. The apertures around the periphery of the diaphragm layer left by the removal of the outwardly extending arms are then sealed by depositing silicon dioxide or other suitable material. The central diaphragm forming portion of the diaphragm layer is doped by implantation or otherwise to impart required electrical characteristics thereto whilst the margin of the diaphragm layer is left undoped to provide electrical isolation of the diaphragm forming portion from the substrate. However, the resistivity of the undoped polysilicon can degrade during subsequent high temperature processing, e.g., to remove stress in the diaphragm.

The present invention has as its object to provide a method of producing a diaphragm on a substrate which will ensure the electrical isolation of the diaphragm from the substrate.

The present invention provides a method of producing on a substrate a diaphragm which is electrically isolated from the substrate, comprising the steps of:

(a) obtaining a substrate having thereon a diaphragm comprising a flexible central portion and a shouldered peripheral portion which supports the central portion above the substrate, the diaphragm being formed from a material which is convertible to a dielectric;

(b) applying a mask over at least a part of said central portion, and (c) converting the unmasked portion of the diaphragm to a dielectric, whereby to electrically isolate said masked central portion from the substrate.

The diaphragm may be formed on said substrate by providing on said substrate a sacrificial layer having at least one arm extending outwardly therefrom, providing a diaphragm layer over said sacrificial layer so that the diaphragm layer overlaps the periphery of said sacrificial layer except in the region of said at least one arm, and removing said sacrificial layer as by etching, e.g., using hydrogen fluoride as the etchant. The gap left by the removal of said at least one arm can be sealed with a dielectric material such as silicon dioxide.

The unmasked portion of the diaphragm layer may be chemically converted to a dielectric.

According to a preferred embodiment of the invention, the substrate is formed from silicon, said diaphragm is formed from polysilicon, said mask is formed from silicon nitride and the unmasked portion of the diaphragm is converted to silicon dioxide as by oxidizing in an oxidizing atmosphere. Further silicon dioxide may be deposited around the periphery of the diaphragm to provide a seal between the diaphragm and the substrate.

The central portion of the diaphragm may be doped by implantation or otherwise treated in known manner to impart required electrical properties thereto and may be treated, e.g., heat treated, to impart required physical properties thereto, e.g., to relieve stress in the diaphragm.

After the unmasked portion of the diaphragm has been converted to a dielectric, the said mask may be removed as by etching or otherwise.

Metal may be deposited on the diaphragm and etched or otherwise patterned to provide electrically conductive tracks.

Figure 2:
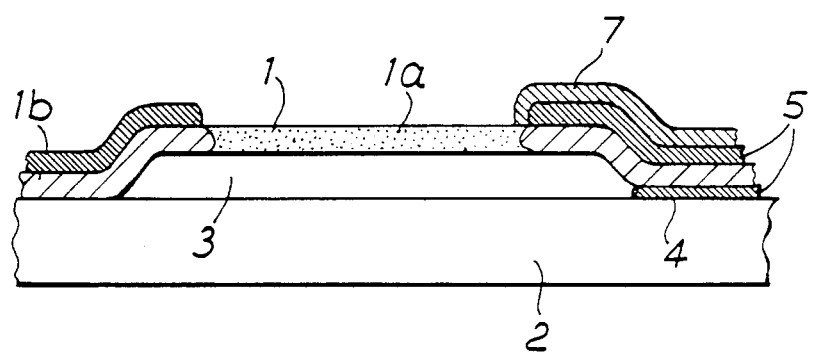

The invention will be more particularly described with reference to the accompanying diagrammatic drawings, in which FIGS. 1 and 2 are sectional elevations of diaphragm structures produced by the method of the present invention.

Referring to FIG. 1, a diaphragm 1 has been provided on a substrate 2 in known manner by depositing a silicon dioxide sacrificial layer (not shown) on the substrate 2, the sacrificial layer having outwardly extending arms of reduced thickness, providing the diaphragm 1 over the sacrificial layer and removing the sacrificial layer by etching to leave the diaphragm 1 on the substrate 2 with the central portion of the diaphragm spaced from the substrate 2 to form a cavity 3 therebetween. In the illustrated embodiment, the diaphragm 1 is formed from polysilicon the central diaphragm forming portion 1a of which has been doped as by implantation to provide required electrical properties and the substrate 2 is formed from silicon. A dielectric such as silicon dioxide is provided around the periphery of the diaphragm 1 so as to close the channels 4 left by the removal of the sacrificial layer. In the alternative, the diaphragm 1 may be formed on the substrate 2 in the manner described in our copending U.S. application Ser. No.131,058, corresponding to British application No. 8629819, the disclosure of which is incorporated herein by reference.

A mask 6, which in the illustrated embodiment is of silicon nitride, is then deposited over the central portion 1a of the diaphragm 1 and the diaphragm then oxidized in an oxidizing atmosphere at elevated temperature to convert the unmasked marginal portion 1b of the diaphragm 1 to silicon dioxide and so ensure complete electrical isolation of the central portion 1a of the diaphragm from the substrate 2.

The mask 6 may either be left in place or may be removed by etching or otherwise as shown in FIG. 2.

Electrically conductive metal may be deposited on the diaphragm 1 and patterned as by etching to provide one or more electrically conductive tracks 7. Where the mask 6 is left in place it may be necessary to remove portions of the mask 6 as by etching to enable the electrically conductive tracks 7 to make electrical contact with the portion 1a of the diaphragm 1.

EXAMPLE

The fabrication steps were as follows:

(a) The silicon single crystal substrate (orientation <111> and of p-type resistivity <0.05 ohm cm) was chemically cleaned using the commercially available 'RCA' etch.
(b) The polished face of the slice was oxidized in wet oxygen at 1100° C. for 3 hours to form an oxide layer 1.2 μm thick.
(c) The layer was photo-etched to form islands which would later define the cavity.
(d) A second layer of oxide was grown at 1000°C. for 20 minutes in wet oxygen giving a 0.2 μm thick oxide in the silicon surrounding the original oxide island.
(e) This oxide was photo-patterned to a similar pattern to the original but having four arms extending beyond the island periphery.
(f) Polysilicon was next deposited to a thickness of 1 μm using LPCVD from silane at 630° C.
(g) The polysilicon was etched so that it covered the original island and anchored itself to the substrate at its periphery except where the second oxide arms protruded about 5 μm beyond this.
(h) The top surface of the slice was then implanted with $5 \times 10^{15}$ cm$^{-2}$ phosphorus ions at 40 KeV to dope the polysilicon n-type.
(i) The slice was immersed in concentrated hydroflouric acid for 3 hours to etch away all oxide and leave a cavity. Etching fluid remaining in the cavity was diluted in deionized water and expelled by evaporation through the side arm channels.
(j) The side arm aperatures were sealed with a layer of 4000 A of silicon dioxide (LTO) from silane and oxygen in a LPCVD furnace at 430° C.
(k) A 1000 A layer of silicon nitride was deposited from dichloro-silane and ammonia in a LPCVD furnace at 740° C.
(l) The nitride was photo-patterned to cover the polysilicon diaphragm and protect it from subsequent oxidation.
(m) LOCOS oxidation was carried out at 1100° C. for 30 minutes and oxidized the uncovered polysilicon completely. This step also activated the implant of step (h), relieved stress in the polysilicon, densified the LTO of step (j) and reduced the residual pressure in the cavity.
(n) A window was etched in the LTO and nitride layers using photo masking and chemical etching leaving the bare polysilicon diaphragm exposed.
(o) Aluminium metallization was electron beam evaporated to 0.2 μm thickness to contact the diaphragm periphery and to 1 μm thickness in a separate step to form the aluminum connecting tracks and bonding pads. The patterns were defined by photo etching.
(p) The aluminum was alloyed into the diaphragm by furnace treatment at 450° C. for 30 minutes in a forming gas ambient.

The structures so formed were found to have negligible electrical leakage and exhibit a capacitance change with pressure which indicated good vacuum sealing characteristics.

The method of the present invention is useful for producing diaphragms for use in capacitance transducers, microphones, rupture discs, resonators, vibrators and like devices.

We claim:

1. A method of producing on a substrate a diaphragm which is electrically isolated from the substrate, comprising the steps of:
   (a) obtaining a substrate having thereon a diaphragm comprising a flexible central portion and a shouldered peripheral portion which supports the central portion above the substrate, the diaphragm being formed from a material which is convertible to a dielectric;
   (b) applying a mask over at least a part of said central portion, and
   (c) converting the unmasked portion of the diaphragm to a dielectric, whereby to electrically isolate said masked central portion from the substrate.

2. A method according to claim 1, wherein the diaphragm is formed on said substrate by providing on said substrate a sacrificial layer having at least one arm extending outwardly therefrom, providing a diaphragm layer over said sacrificial layer so that the diaphragm layer overlaps the periphery of said sacrificial layer except in the region of said at least one arm, and removing said sacrificial layer.

3. A method according to claim 2, wherein said sacrificial layer is deposited on said substrate, said diaphragm layer is deposited over said sacrificial layer and said sacrificial layer is removed by etching.

4. A method according to claim 2, which comprises sealing with a dielectric material the gap left by said at least one arm.

5. A method according to claim 4, wherein said sacrificial layer is deposited on said substrate, said diaphragm layer is deposited over said sacrificial layer and said sacrificial layer is removed by etching.

6. A method according to claim 5, wherein silicon dioxide is provided around the periphery of the diaphragm to provide a seal between the diaphragm and the substrate.

7. A method according to claim 5, wherein the unmasked portion of the diaphragm is chemically converted to a dielectric.

8. A method according to claim 7, wherein said substrate is formed from silicon, said diaphragm is formed from polysilicon, said mask is formed from silicon nitride and the unmasked portion of the diaphragm is converted to silicon dioxide.

9. A method according to claim 8, wherein the unmasked portion of the diaphragm is oxididized in an oxidizing atmosphere to convert the polysilicon to silicon dioxide.

10. A method according to claim 9, wherein oxidizing of the unmasked portion of the polysilicon diaphragm is carried out at elevated temperature of 1000° C. or more.

11. A method according to claim 10, wherein silicon dioxide is provided around the periphery of the diaphragm to provide a seal between the diaphragm and the substrate.

12. A method according to claim 11, wherein the central portion of the diaphragm is treated to impart predetermined electrical or physical properties thereto.

13. A method according to claim 12, wherein said mask is removed after the unmasked portion of the diaphragm has been converted to a dielectric.

14. A method according to claim 1, wherein the unmasked portion of the diaphragm is chemically converted to a dielectric.

15. A method according to claim 1, wherein said substrate is formed from silicon, said diaphragm is formed from polysilicon, said mask is formed from silicon nitride and the unmasked portion of the diaphragm is converted to silicon dioxide.

16. A method according to claim 15, wherein the unmasked portion of the diaphragm is oxidized in an oxidizing atmosphere to convert the polysilicon to silicon dioxide.

17. A method according to claim 16, wherein oxidizing of the unmasked portion of the polysilicon diaphragm is carried out at elevated temperature of 1000° C. or more.

18. A method according to claim 1 wherein silicon dioxide is provided around the periphery of the diaphragm to provide a seal between the diaphragm and the substrate.

19. A method according to claim 1, wherein the central portion of the diaphragm is treated to impart predetermined electrical or physical properties thereto.

20. A method according to claim 1, wherein said mask is remove after the unmasked portion of the diaphragm has been converted to a dielectric.

* * * * *